United States Patent
Major et al.

(10) Patent No.: US 9,264,448 B2
(45) Date of Patent: *Feb. 16, 2016

(54) APPARATUS, AND AN ASSOCIATED METHOD, FOR FACILITATING SECURE OPERATIONS OF A WIRELESS DEVICE

(75) Inventors: Daniel Jonas Major, Ottawa (CA); Oliver Whitehouse, Belmont (GB); Neil Patrick Adams, Kitchener (CA); Christopher Lyle Bender, Kitchener (CA); Van Quy Tu, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 584 days.

This patent is subject to a terminal disclaimer.

(21) Appl. No.: 12/828,668

(22) Filed: Jul. 1, 2010

(65) Prior Publication Data
US 2011/0179465 A1 Jul. 21, 2011

Related U.S. Application Data

(60) Provisional application No. 61/296,824, filed on Jan. 20, 2010.

(51) Int. Cl.
*G06F 21/22* (2006.01)
*H04L 29/06* (2006.01)
*H04W 12/08* (2009.01)

(52) U.S. Cl.
CPC ............... *H04L 63/20* (2013.01); *H04W 12/08* (2013.01)

(58) Field of Classification Search
CPC ..... G06F 21/00; G06F 21/6218; G06F 21/31; H04L 63/08; H04L 63/083; H04L 63/10
USPC .............................................................. 726/2
See application file for complete search history.

(56) References Cited

U.S. PATENT DOCUMENTS

| | | | |
|---|---|---|---|
| 6,393,569 B1* | 5/2002 | Orensheyn | 726/4 |
| 7,065,588 B2* | 6/2006 | Konda | G06F 17/30569 707/E17.006 |
| 7,590,407 B1* | 9/2009 | Honkala et al. | 455/410 |
| 7,743,423 B2* | 6/2010 | Lange et al. | 726/26 |
| 7,784,102 B2* | 8/2010 | Sperry | 726/27 |
| 7,882,352 B2* | 2/2011 | Dive-Reclus | G06F 21/53 713/164 |
| 8,196,213 B2* | 6/2012 | Klucher et al. | 726/27 |
| 8,458,809 B2* | 6/2013 | Adams | G06F 21/33 380/270 |

(Continued)

FOREIGN PATENT DOCUMENTS

WO 02/25409 A2 3/2002

*Primary Examiner* — Azizul Choudhury
*Assistant Examiner* — Tariq Najee-Ullah
(74) *Attorney, Agent, or Firm* — Jose Gutman; Fleit Gibbons Gutman Bongini & Bianco P.L.

(57) ABSTRACT

An apparatus, and an associated method, facilitates security at a wireless device, such as a wireless device comprising a mobile computing platform. A security decision engine is provided that monitors for an event necessitating a security decision. When a security decision is required, request is made of a knowledge fetcher, provided by a trusted third-party, installed at the wireless device for the security decision. The knowledge fetcher obtains the security decision, such as by obtaining the security decision from a remote, trusted third-party server, and provides the security decision to the decision engine. Use is made of the security decision pursuant to a setting for which the security decision is needed.

20 Claims, 5 Drawing Sheets

(56) References Cited

U.S. PATENT DOCUMENTS

| | | | |
|---|---|---|---|
| 2002/0138771 A1* | 9/2002 | Dutta | 713/202 |
| 2003/0041095 A1* | 2/2003 | Konda | G06F 17/30569 709/201 |
| 2003/0159070 A1* | 8/2003 | Mayer | G06F 21/53 726/22 |
| 2003/0167356 A1* | 9/2003 | Smith | G06F 9/495 719/328 |
| 2004/0034794 A1* | 2/2004 | Mayer | G06F 21/567 726/23 |
| 2004/0223489 A1* | 11/2004 | Rotsten et al. | 370/352 |
| 2005/0037733 A1* | 2/2005 | Coleman et al. | 455/411 |
| 2006/0053426 A1* | 3/2006 | Dive-Reclus | G06F 21/53 719/328 |
| 2006/0288407 A1* | 12/2006 | Naslund et al. | 726/9 |
| 2007/0204039 A1* | 8/2007 | Inamdar | 709/225 |
| 2008/0120611 A1* | 5/2008 | Aaron | 717/174 |
| 2009/0048894 A1* | 2/2009 | Simpson et al. | 705/9 |
| 2009/0068986 A1* | 3/2009 | Wang et al. | 455/411 |
| 2009/0254993 A1* | 10/2009 | Leone | 726/25 |
| 2009/0288079 A1* | 11/2009 | Zuber et al. | 717/176 |
| 2010/0011446 A1* | 1/2010 | Klucher et al. | 726/27 |
| 2010/0107229 A1* | 4/2010 | Najafi et al. | 726/6 |
| 2010/0180111 A1* | 7/2010 | Hahn et al. | 713/150 |
| 2011/0214184 A1* | 9/2011 | Whitehouse et al. | 726/24 |

\* cited by examiner

APPARATUS, AND AN ASSOCIATED METHOD, FOR FACILITATING SECURE OPERATIONS OF A WIRELESS DEVICE

CROSS REFERENCE TO RELATED APPLICATION

This application claims priority to U.S. Provisional Patent Application No. 61/296,824, filed Jan. 20, 2010, the content of which is incorporated herein by reference.

The present disclosure relates generally to securely operating a wireless device in conformity with desired settings. More particularly, the present disclosure relates to apparatus, and associated methods, by which to acquire, or provide, security decisions that facilitate secure operation of the wireless device.

Trusted, third-party security providers are enabled to make decisions, or furnish decision information, on behalf of end-users of the wireless devices and enterprise administrators.

BACKGROUND OF THE INVENTION

The use of wireless communication devices is pervasive throughout modern society. And, as the capabilities of wireless devices and the communication systems in which they are operable increase, together with increasingly lower operating costs, their use shall likely become even more prolific.

So-called smart phones are examples of wireless devices that have achieved significant levels of popular usage. Smart phones comprise mobile computing platforms. And, such devices typically include applications that perform processing or communication operations. Operations of the applications are sometimes initiated by a user of the device, such as through interaction with a user interface. Other times, applications are invoked automatically. The applications provide many varied operations and functions and often provide for the processing upon, and communication of, large amounts of data.

The applications formed, e.g., by one or more modules, may be installed at the device when the device is initially configured, or may be installed later. When later-installed, the applications, and the modules of which the applications are formed, are, e.g., downloaded to the wireless device. The downloading is effectuated, for instance, by way of an air interface.

The applications have conventionally been created by the manufacturer or seller of the wireless device or installed under the supervision of the manufacturer or seller. Applications are, however increasingly created by others and installed at the wireless device subsequent to its manufacture and initial configuration. That is to say, the creation of the applications are sometimes outsourced to other entities, referred to as "third parties". These applications are sometimes referred to as third-party applications.

Security considerations necessitate that the third party applications be authorized to be operated at the wireless device, that is to say, to be installed and run or executed. The third-party nature of the applications inherently leave question as to the appropriateness of installation and running of a third-party application at the wireless device. While, most straight forwardly, the user of the wireless device or the enterprise operator can be compelled to make selection of permission related to the downloading and running of the third-party application, this can readily become cumbersome and unwieldy, particularly when multiple, third-party applications are to be utilized at the wireless device.

More generally, mobile computing platforms have need for decisions to be made about various settings of its components. But, for any of various reasons, for instance, lack of understanding or lack of motivation, a user might not regularly make informed decisions.

A need exists, therefore, to provide a better manner of making decisions relating to component settings at a wireless device.

It is in light of this background information relating to wireless devices that the significant improvements of the present disclosure have evolved.

DETAILED DESCRIPTION

The present disclosure, accordingly, advantageously provides an apparatus, and an associated method, by which to securely operate a wireless device in conformity with desired settings.

Through operation of an embodiment of the present disclosure, a manner is provided by which to acquire, or provide, decisions that facilitate secure operation of the wireless device.

In one aspect of the present disclosure, trusted, third-party, security providers are enabled to make security decisions on the behalf of wireless-device users and enterprise administrators relating to settings of components at wireless devices.

In another aspect of the present disclosure, a security decision engine is provided. The security decision engine monitors for occurrence of an event at the wireless device necessitating a decision related to a setting of a component at the wireless device. Upon occurrence of the event, the security decision engine requests a security decision. Once obtained, further action is undertaken. The security decision engine further, for example, presents information to a user of the wireless device.

In another aspect of the present disclosure, a security decision engine is provided that coordinates acquisition of security decisions that are provided by a third-party, i.e., an outsourced party, provider and uses the acquired, security decisions pursuant to further operation of the wireless device. The decision engine also, for example, provides state information and statistics.

In another aspect of the present disclosure, a knowledge fetcher, i.e., a security decision provider, is provided. The knowledge fetcher provides security decisions to the decision engine. The knowledge fetcher obtains the security decision from a remote location, such as at a third-party decision server of a trusted third party, or makes a determination of the security decision locally. Once obtained, the knowledge fetcher forming the security decision provider provides the security decision to the decision engine.

In another aspect of the present disclosure, the third-party, security decision server responds to real-time security decision requests from knowledge fetchers of various wireless devices that form authorized clients. In one implementation, the third-party, security decision service acts as a push device to push security decisions to client devices.

In another aspect of the present disclosure, the setting relates to an application, and an application security decision engine (ASDE) client application is provided. The ASDE client application, amongst other things, presents security information to a user of the wireless device. The application is further, e.g., responsible for license management of the application and for installing the knowledge fetcher, associated with the application, at the wireless device. And the ASDE client application further is capable, in an example implementation, to control the knowledge fetchers, including their installation.

In another aspect of the present disclosure, a decision engine monitors for the occurrence of an event at the wireless device, or elsewhere, necessitating a security decision related to a setting of a component at the wireless device. Upon occurrence of the event, a request is made by the decision engine for a security decision. The request is sent to a knowledge fetcher or access is made to a cache for previously-stored security decisions. A security decision variously comprises a single attribute or multiple attributes.

Detection is made of a security decision, either provided by a knowledge fetcher or retrieved from the cache. And the security decision is provided to a security-decision consumer. When the security decision pertains to an application, the security decision is used to form a permission needed pursuant to its associated application. The permission is provided to a security-decision consumer, e.g. control engine, and the permission is used to control the application, or module thereof, in conformity with the permission. Permissions are of various types and pertain, for instance, to the ability of an application to register and to provide information to a wireless device, to the ability of an application to make local connections on the wireless device by way of a USB (Universal Serial Bus), and the ability of an application to send and receive data over a WI-FI link as well as access to information about the WI-FI network. Permissions could also control or authorize activities of elements, other than applications, of a wireless device.

In another aspect of the present disclosure, when detection is made of an event requiring a security decision relating to a security-decision consumer, the knowledge fetcher provides all of the security-decision information available to it that would be relevant to a security-decision-consumer. That is to say, the decision engine is provided not only with the specific security decision needed in response to the particular event, but also with additional security decisions that might later be needed by the security-decision consumer.

In another aspect of the present disclosure, detection of a request for a security decision is made at a detector of a knowledge fetcher. Responsive to detection of the request, the security decision is obtained. The security decision is obtained by, e.g., making an additional request of a remote device, such as a third-party decision server, or the like. If the remote server, or device, fails to provide a security decision, or does not provide a security decision within a time frame in which the decision is needed, or if the security decision is not one that benefits from reference to the third-party decision server, a decision may be made locally at the knowledge fetcher. The security decision might also be made locally without making, or waiting for response from, the remote decision server. The security decision, once obtained in whatsoever manner, is provided to the decision engine, and the decision engine makes further use of the security decision.

By providing the authority to make the security decisions to a trusted, third-party, a user of the wireless device or an enterprise operator with which the wireless device is associated, need not make the individual decisions. Because the decision engine and knowledge fetcher, i.e., the security decision provider, are separate functional elements of the wireless device, different entities are able to provide the separate functional elements at the wireless device. And, by outsourcing the security-decision authority to a trusted party, wireless-device security is not negatively affected while also enabling a party best-capable to make the security decision to do so.

In these and other aspects, therefore, an apparatus, and an associated method is provided for facilitating security at a wireless device. A detector is operable responsive to the occurrence of an event that necessitates an event security decision to permit selected, wireless-device operation. The detector is configured to detect an outsourced-party-provided security decision. A permission provider is adapted to receive indication of the outsourced-party-provided security decision detected by the detector. The permission provider is configured to provide an indication of whether to permit the selected, wireless-device operation based upon the outsourced-party-provided security decision.

In these and further aspects, therefore, further apparatus, and an associated method, is provided for facilitating security at a wireless device. A detector is configured to detect a security-decision request made responsive to occurrence of an event necessitating an event security decision to permit selected wireless-device operation. A security decision provider is configured to provide an outsourced-party-provided security decision responsive to detection of the security-decision request.

Figure 1:
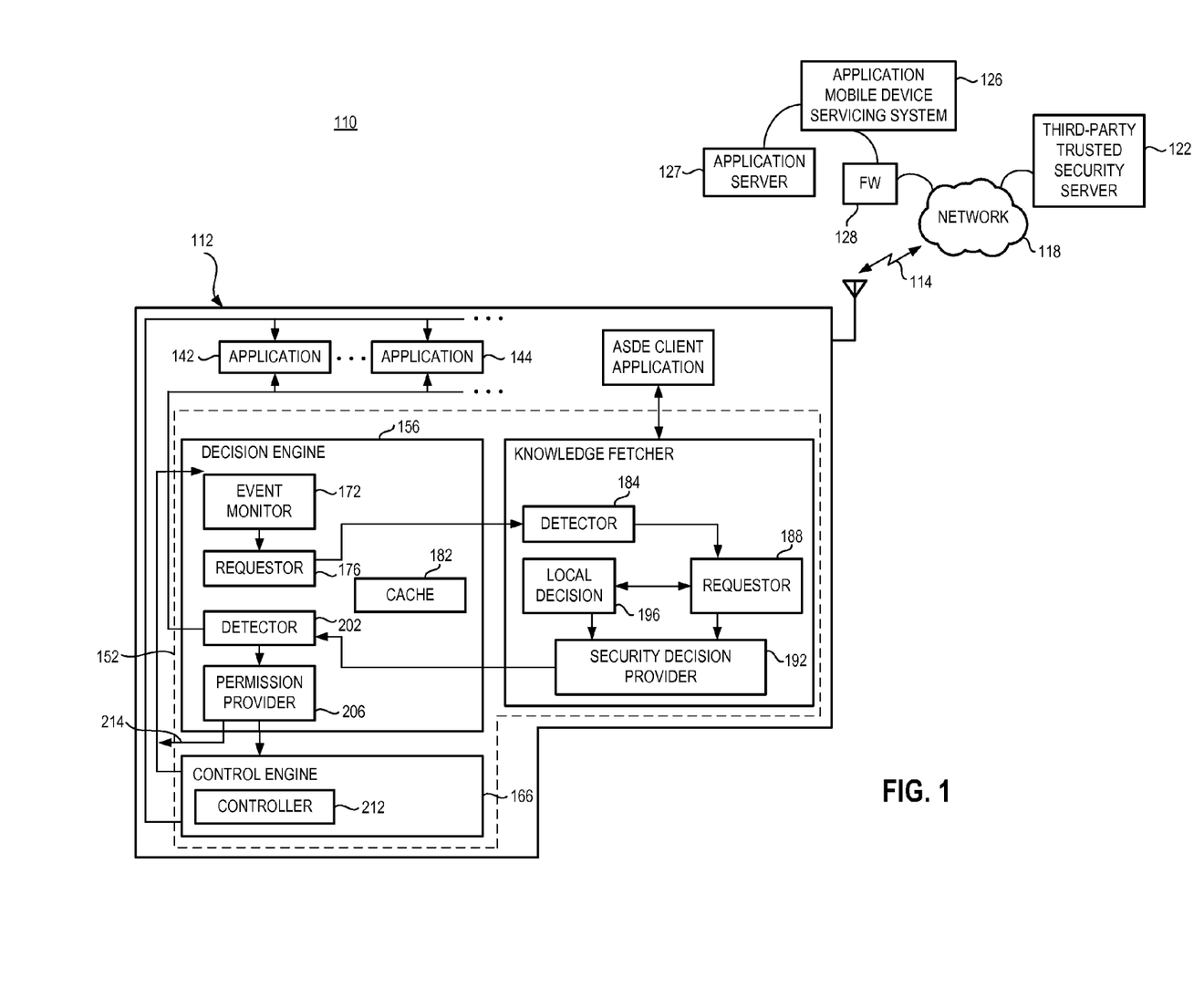
FIG. 1 illustrates a functional block diagram of a radio communication system that includes an embodiment of the present disclosure.

Referring first, therefore, to FIG. 1, a communication system, shown generally at 110, provides for communications with a wireless device 112. The wireless device communicates by way of an air interface 114 defined between the wireless device and a network 118, here representative of both a radio access network (RAN) and a data network, such as the internet. Although the term "air interface" is often associated with "cellular" or other carrier-operated mobile networks, the air interface 114 could employ any suitable wireless communications technology, including without limitation network technologies referred to as cellular, PCS, GSM, GPRS, EDGE, LTE, CDMA, 2G, 3G, 4G, WIFI, WIMAX, Bluetooth, and the like. In conventional manner, communication devices are functionally connected to the network 118, here including a third-party decision server 122, an optional mobile device servicing system 126, and an optional application server 127, here positioned behind an optional enterprise firewall (FW) 128. Application server 127 may implement one or more applications, and may for example be an e-mail server, a web server, a file server, or the like, or any combination, and the services provided thereby may be available to mobile device 112 and to other consumers. The mobile device servicing system 126 may provide services to mobile devices, including without limitation, managing synchronization and other interactions between the wireless device 112 and application server 127, enhancement or optimization of content for use by the wireless device 112, and the like. The mobile device servicing system 126 may be implemented using a software product commercially available under the name BLACKBERRY ENTERPRISE SERVER from Research In Motion of Waterloo, Ontario, Canada. Other software products, or combinations thereof, could also be used. The illustrated system is by way of example only, and, in other implementations, the communication system is configured in other manners. The entities of the communication system 110 are implementable in any desired manner, including hardware components, software components and combinations thereof.

The wireless device 112 here comprises a mobile computing platform, capable of performing processing operations, such as through execution or otherwise running applications at the device. More generally, the wireless device is representative of any communication device capable of such processing functionality and communication connectivity with remote devices.

Applications which may be operated at the wireless device include applications that are created by third-parties, that is, parties other than an enterprise associated with the wireless device, its manufacturer, or the user of the wireless device. As mentioned previously, multiple applications might be installed or downloaded to the wireless device or be available for downloading to the wireless device. Here, two applications, an application 142 and an application 144 are representative of applications installed at the wireless device. During operation of the wireless device selection might be made to invoke, run, or otherwise execute the applications 142 or 144 or other applications. Selection is automatic or by way of user initiation, such as by way of a user interface (not separately shown) of the wireless device. More generally, the applications are representative of any component of the wireless device having a setting for which a decision might be required. That is to say, the applications comprise security-decision consumers, and a component having a setting that requires a security decision more generally, comprises a security-decision consumer. When the decision is provided by a trusted, third party, the decision is referred to herein as a security decision. Examples of such components further include, for example, a web browser-related component or an email-system-related component.

The wireless device further includes an apparatus 152 of an embodiment of the present disclosure. The apparatus is formed of functional elements, implementable in any appropriate manner including hardware elements, software elements, firmware elements, or combinations thereof. The apparatus here includes a decision engine 156, one or more knowledge fetchers 162, each forming a security decision provider, and a security control engine 166. While, in the example implementation shown in the Figure, the elements of the apparatus 152 are implemented at the wireless device, in other implementations, the elements, or portions thereof, are positioned elsewhere, including distributed amongst various entities of the communication system.

The decision engine 156 monitors for system events, such as application/module installation that necessitates new security decisions. When a new security decision related to an application or module is required, the decision engine provides the knowledge fetcher with information associated with the identity of the module for which a security decision is required. The modules are identified in any appropriate manner, such as by SHA-1 hash values or versioned structures that include the hash value. More generally, when the security decision is required for a setting at the wireless device, the decision engine provides the knowledge fetcher with the identity of the setting for which a security decision is required.

The knowledge fetcher preferably provides a security decision within a short time frame, which in practice may be vary depending on the needs of the security-decision consumer, the availability of information from the third-party security server 122, network latency, and other factors. The expected time frame for receiving the security decision may be specified in the request made by the decision engine. In one implementation, the knowledge fetcher also proactively provides security decisions. A cache 182, which may be persistent, at the decision engine 156 maintains a cache of security decisions provided thereto by the knowledge fetcher. In one implementation, the cache is not directly exposed to other components, and, when stored therein, the security decisions are converted into another format, if desired. In one implementation, security decisions are pre-installed in the cache 182 and, if the pre-installed security decisions do not correspond to settings used at the wireless device (i.e., are not needed by any of the security decision consumers registered on the wireless device 112), the decision engine discards the security decisions. If later needed, a request is made of the knowledge fetcher.

When the security decision pertains to an application, or module thereof, the decision engine may provide the security control engine 166 with permissions, including excluded dispositions, recommended by the security provider. In this case, the decision engine 166 is itself a security-decision consumer. The permissions are transmitted to or retrieved by the control engine 166, which comprises an application control engine when configured to control applications or modules. (However, the control engine 166 could also control components or elements of the wireless device other than applications.) When so-configured, the control engine calculates, or recalculates, permissions. In the example implementation, the decision engine 156 provides permission to the control engine in a near-instantaneous manner. In this implementation, the decision engine may be unable to wait for the knowledge fetcher to retrieve a security decision over the network. The cache 182 is accessed when responding to such a request. In one implementation, the decision engine refers to the knowledge fetcher 162 while specifying a brief time out.

The decision engine 156, in the example implementation, provides an API (Application Program Interface) to retrieve statistics about the impact of security decisions. The statistics provided may include, e.g., information on the number of security decisions being actively enforced and the number of applications that had been excluded as a result of security decisions.

During exemplary configuration of the wireless device forming a mobile computing platform, a default stub knowledge fetcher is provided by the device manufacturer or seller. A third-party, i.e., the outsourced party, provides additional components, namely the knowledge fetcher. Once installed and activated, the knowledge fetcher registers itself with the decision engine 156 as a security decision provider. Multiple knowledge fetchers are includable at a single wireless device, with different ones of the knowledge fetchers associated with different settings, applications, or groups thereof. A knowledge fetcher may, if desired, subsequently be unregistered. Un-registering occurs, for instance, if a license of the third party associated with the knowledge fetcher expires, but could also occur at the request of the device user, or at the instruction of an authorized administrator, such as the administrator of a fleet of wireless devices, of which device 112 is a member, which fleet may be associated with an enterprise or organization.

In one implementation, the knowledge fetcher 162 pushes the security decisions to the decision engine 156. By pushing a security decision to the decision engine, the security decision is proactively provided, thereby reducing overall security-decision retrieval latency. Pushing of a security decision is also made, for instance, when the knowledge fetcher anticipates a security decision query based on a record or pattern of prior queries. This functionality is also used, for instance, responsive to a malware outbreak or to correct prior security decisions. In one implementation, the knowledge fetcher 162 first registers with a push API of the wireless device with the registration permitting the security decision server associated with the knowledge fetcher to actively push security decisions. In the event that a pushed, security decision pertains to a setting not used at the wireless device, the decision engine discards the push security decision.

The knowledge fetcher, in the example implementation, does not communicate user-identifiable information aside from information reasonably necessary to verify subscription information. Communications of the knowledge fetcher may also be encrypted.

A security event monitor 172 of the decision engine 156 monitors for the occurrence of an event needing a security decision including, for instance, the occurrence of an event that might affect a security decision. The security event monitor 172 also monitors for an explicit request for a security decision including, e.g., a user or operator-generated request. A security decision might be needed for any of various settings at the wireless device, including, settings related to downloading and running of applications, or modules thereof.

Upon occurrence of the event or explicit request, a security decision requestor 176 requests a security decision. The request is provided to the knowledge fetcher 162 or to query a cache 182. When the request is delivered to the knowledge fetcher, a security-decision-request detector 184 detects the request for the security decision. When the request is detected, a knowledge-fetcher security decision requestor 188 forms a request for communication to the third-party decision server 122 for the security decision and detects a response thereto. In the communication system shown in FIG. 1, the request is sent by way of the air interface 114 and routed through the network 118 for delivery to the server 122. And a response to the request is returned, also by way of the network 118 and the air interface 114 to the knowledge fetcher. The security decision is forwarded to a security decision provider 192. If the requestor 188 does not obtain a security decision from the server 122, or the decision is not available within a deadline (which may be specified in a request from the decision engine), or the security decision is one that would not benefit from reference to the server 122, a decision is formed at an element of the knowledge fetcher, here indicated by the local decision former 196. When formed locally, the security decision is also forwarded to the security decision provider 192. In one implementation, a security decision is provided not only for the specific event that precipitated the request, but additionally for several or all security events arising from which security decisions that might subsequently be needed by the security-decision consumer.

The security decision provider 192 provides the security decision to the decision engine 156. A security-decision-result detector 202 of the decision engine detects the security decision, whether provided by the knowledge fetcher or by the cache 182. Indications of the security decisions are forwarded to a permission provider 206. The permission provider forms permissions, indications of which are forwarded on to a security-decision consumer, such as the security control engine 166. When the security decision is related to an application permission, such as relating to downloading of an application to the wireless device or running of the application, the security control engine, here indicated by way of a controller 212 of security control engine 166, controls downloading or running of the application, or component modules thereof, in conformity with the permission. If the security decision relates to another type of setting at the wireless device, the permission provider provides the permission indication, here indicated by way of the line 214, so that action related to the setting can be made in conformity with the permission. Examples of other settings include, for instance, permissions related to websites that are permitted to be visited by a user of the wireless device and changes to pre-installed certificates.

The security decision provided by the knowledge fetcher to the decision engine, in the example implementation, comports to a security decision format that includes a first field, a second field, and a third field. In one implementation, the first field comprises a version field that identifies the version of the security decision format. When the entities are Java-implemented, the version field may be of an int Java-type. When the security decision pertains to an application, the second field identifies the module of the application to which the security decision pertains. When the module is identified by a hash value, the second field forms a hash, such as an SHA-1 hash of the module. When Java-implemented, the second field may be of a byte [20] Java-type construct. The third field identifies the permission and forms a permissions field. The permission is identified, with an explicit allow, prompt, or deny setting for each defined permission or, e.g., forms an excluded disposition state, i.e., excluded or not excluded.

The security control engine 166, in the example implementation, manages and enforces application permissions. That is to say, the security control engine 166 enforces security decisions provided thereto by the decision engine 156. In this way, security control engine 166 may be considered a security decision consumer. Other security decision consumers may be present at the wireless device 112. For example, applications 142 and 144 could be security decision consumers and could receive security decisions from decision engine 156. Any other component, application, element, module, or similar unit of the wireless device 112 could also be a security decision consumer. In some embodiments, a security decision used by a security decision consumer, such as applications 142 or 144, may relate to a setting or parameter which is not a permission that is enforced by controller 212 of security engine 166. In that case, the security decision consumer could request a security decision from decision engine 156, including by generating a security event that is registered by security event monitor 172. The security decision consumer may receive a security decision directly from the decision engine 156, e.g., via security decision detector 202. The security decision could originate from any of the cache 182, the local decision former 196 of knowledge fetcher 162, or the third-party trusted security server 122, and may arrive via a corresponding one of the above-described mechanisms and paths.

In the event that there is a conflict between security decisions, the security control engine is further configured in the example implementation to favor a security decision set by an authorized administrator (such as the administrator of a fleet of wireless devices, of which device 112 is a member, which fleet may be associated with an enterprise or organization) followed by, or ultimately, by a user-provided security decision. And, in the example implementation, third-party security decisions override implicit and default permission settings. Also in the example implementation, an excluded disposition is subject to conflict resolution logic. For example, if a third-party security decision indicates that a module should be excluded but an enterprise operator specifies that the module is required, then the third-party security decision may be ignored. Other security-decision consumers are analogously configured.

Figure 2:
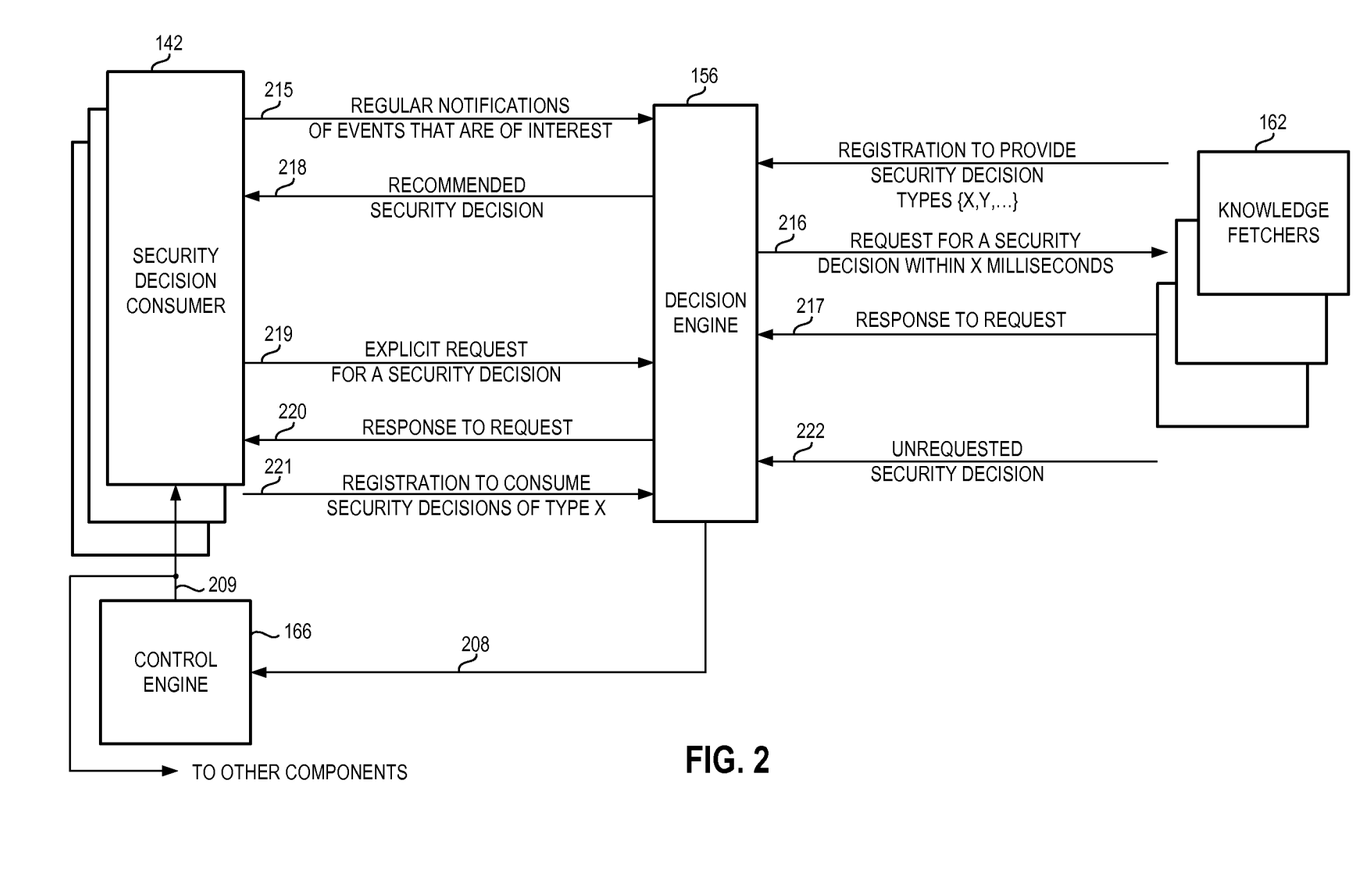
FIG. 2 illustrates a functional representation of portions of the wireless device embodied in the radio communication system shown in FIG. 1.

FIG. 2 illustrates portions of the wireless device 112, shown previously in FIG. 1. Here, a plurality of security-decision consumers, 142, security control engine 166 (which is also a security decision consumer), a decision engine 156, and a plurality of knowledge fetchers 162 are shown. Example operation, and interaction between these elements are represented.

The security-decision consumers 142 provide regular notifications, indicated by the segment 215, of events of interest to the decision engine 156. Responsive to the occurrence of an event of interest, the decision engine generates a request, indicated by the segment 216 for a security decision, here within a specified period of time, such as X milliseconds. An appropriate knowledge fetcher 162 obtains a security decision and provides a response, indicated by the segment 217, that is returned to the decision engine 156. In some cases, the security decision, indicated by segment 218, may be one which is not to be enforced by the security control engine 166, may for example be provided directly to the security decision consumer which produced the event that elicited the security decision. In other cases, the security decision is to be enforced by the security control engine 166, and the decision or permissions derived therefrom, represented by segment 208, are provided by to the security control engine 166. The security control engine 166 may enforce the permissions via an interaction, indicated by segment 209, with the originating component 142. Alternatively or in addition, the security control engine may enforce the security decision or permissions derived therefrom via an interaction (also indicated by segment 209) with other components of the wireless device 112, so as to recruit the assistance of those components in enforcement. For example, the security control engine 166 might instruct a network interface component (not shown) to prohibit access to an external resource, location, address, or the like, by the security decision component 142, pursuant to the security-decision consumer 142.

Additionally, a security-decision consumer further makes an explicit request, indicated by the segment 219, for a security decision. The request is also provided to the decision engine, and the request 216 is made to an appropriate knowledge fetcher, a response 217 is returned by the knowledge fetcher, and a security decision 218 is provided, indicated by the segment 220, to the appropriate security-decision consumer 142. Alternatively or in addition, the security decision 218 could be enforced by the security control engine in the manner earlier described.

In additional operation, a security-decision consumer 142 further generates a registration, indicated by the segment 221, to consume security decisions of a certain type. The registration is provided to the decision engine. And, in further operation, the knowledge fetchers are further capable of providing unrequested security decisions, indicated by the segment 222, to the decision engine. Responsive to unrequested security decisions, the decision engine is further able to provide a recommended security decision, such as that represented by the segment 218, to a security-decision consumer component 142.

Figure 3:
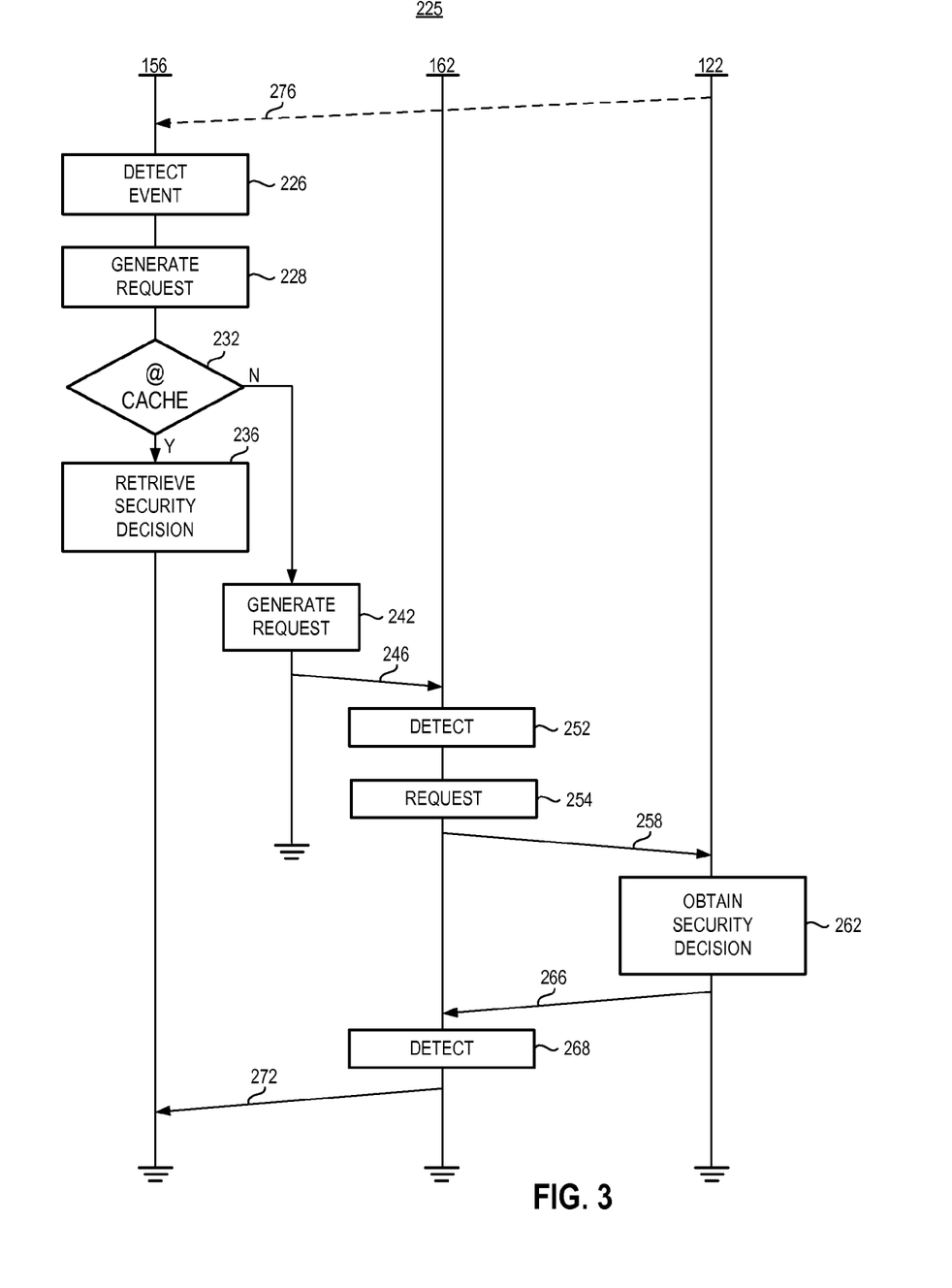
FIG. 3 illustrates a message sequence diagram representative of signaling generated during operation of the communication system shown in FIG. 1.

FIG. 3 illustrates a process sequence diagram 225 representative of example operation of parts of the communication system 110 shown in FIG. 1. Operation of, and signaling of, the decision engine 156, knowledge fetcher 162, and server 122 is represented in FIG. 3.

The decision engine 156 monitors for the occurrence of an event necessitating a security decision related to a setting, i.e. a security-decision consumer. When an event is detected, indicated by the block 226, a request is generated, indicated by the block 228. A determination is made, indicated by the decision block 232, as to whether an appropriate security decision is stored at a local cache. If so, the yes branch is taken to the block 236, and the security decision is retrieved from the cache. If the security decision is not at the cache, the no branch is taken from the decision block to the block 242. At the block 242, a request is generated and sent, indicated by the segment 246, to knowledge fetcher 162. The request is detected, indicated by the block 252 and the knowledge fetcher forms a request, indicated by the block 254, and sends the request, indicated by the block 258 to the server 122. When received at the server 122, the security decision is obtained, indicated by the block 262. And the security decision is returned, indicated by the segment 266, to the knowledge fetcher 162. The security decision is detected, indicated by the block 268 and the security decision is provided, here indicated by way of the segment 272, to the decision engine 156. The decision engine makes further use of the security decision.

Segment 276 is further shown in FIG. 3. The segment is representative of pushing of a security decision to the decision engine. The pushing is here initiated at the server 122 to push a security decision to the knowledge fetcher and, in turn, to the decision engine. In another implementation, a push is initiated at the knowledge fetcher.

FIG. 4 again shows the communication system 110 having the wireless device 112 in communication connectivity with the network 118. Here, example operation of an embodiment of the present disclosure is represented pursuant to a selection at the wireless device to download an application formed of one or more modules to the wireless device. In this implementation, the wireless device makes the request, indicated by the segment 276, and the request is routed to the third party security server, which here also sources the application, indicated by the block 278.

Figure 4:
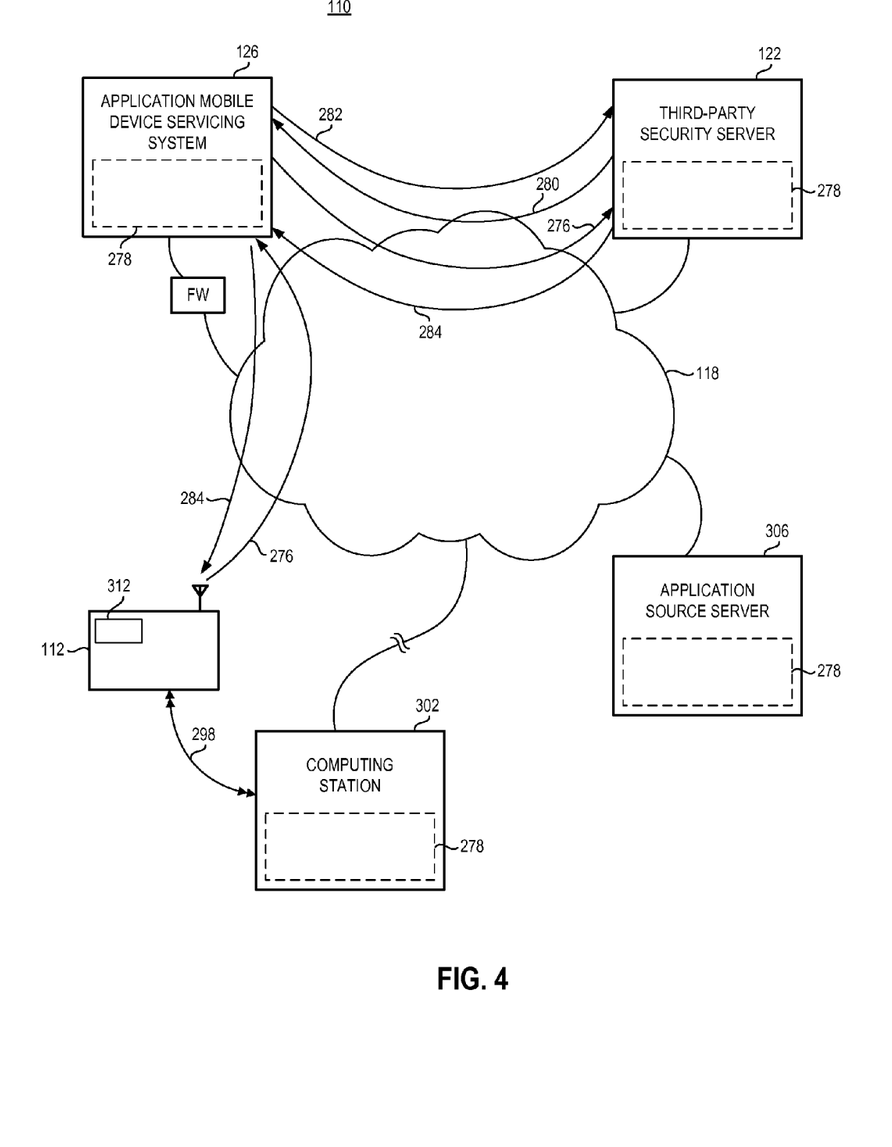
FIG. 4 illustrates a functional block diagram of a radio communication system, analogous to the system shown in FIG. 1, here showing example operation of an embodiment of the present disclosure.

Responsive to the request, the application is temporarily stored, i.e., cached, for example, at the mobile device servicing system 126 or other functional entity capable of caching an application, such as a file server, proxy server, or the like. The segment 280 is representative of the providing of the application or module to the caching functional entity. The caching functional entity could, for example, be operated by or under the control of an enterprise, for example, where the mobile device 112 is a member of a fleet of devices associated with the enterprise. The caching functional entity could also, for example, be operated by and in the network of a mobile network operator or another service provider. Here, the downloading of the application or module to the wireless device is an event that necessitates a security decision. And, an apparatus 278, analogous in functionality to at least the decision engine 156 of the apparatus 152 shown in FIG. 1 is embodied, in this implementation at the mobile device servicing system 126. The apparatus 278 includes the functionality of the security event monitor 172, security decision requestor 176, security decision detector 202, and permission provider 206. When detection is made of a wireless-device selection to download install, and/or run an application, the enterprise entity makes a request, indicated by the segment 282, on behalf of the wireless device. If the trusted, third party security server disallows the downloading of the application to the wireless device, the application or module is not downloaded. Instead, only a message is sent, indicated by the segments 284 to inform the wireless device that the application shall not be downloaded and installed at the wireless device. The message is, for instance, displayed at a user interface of the wireless device. If, conversely, the trusted, third-party security server allows the downloading of the application or module with an affirmative security decision, the application or module is sent directly to the wireless device, together with any needed application permissions, thereby obviating the need to have the wireless device send any further over-the-air signals for the downloading of the application or module. When the application is cached at the caching functional entity, the application is sent directly from the caching functional entity to the wireless device, together with the application permissions provided by the third-party server. Alternately, the application is sent together from the third-party server, or other appropriate source, together with the application permissions.

In the event that the trusted, third-party permits the downloading of the application or module, but with caveats, i.e., restrictions on the application permissions, in the example implementation, the security server sends the caveats to the wireless device prior to download of the application. The user is asked for confirmation of the download given the caveats, which might constraints on the usability of the application or module. In one implementation, a user or enterprise sets operation so that the caveats are sent, requiring user affirmation, prior to re-downloading of the application or module.

Applications and modules are installed at a wireless device in any of various manners, and operation of an embodiment of the present disclosure is operable in conjunction with the additional manners by which the application or module is installable at the wireless device. For instance, the wireless device is connectable, here indicated by way of a wired connection 298 to a computing station 302, such as a portable computer. An application module stored at the computing station 302 can be loaded directly on to the wireless device. In conjunction with operation of this implementation, the computing station comprises the apparatus 278, having the functionality, as just described. Here, a request for a security decision is generated by the computing station, which is connected to the network 118. That is to say, decision-engine functionality, analogous to the decision engine 156, is provided to the computing station 302. Signaling, analogous to that represented by the segments 276-284, is used to request a security decision and act responsive to receipt of a security decision pursuant to permission to load the application at the wireless device.

In another implementation, the application is sourced at a network entity 306, such as a server that sources applications, for pay or for free. In analogous manner, here, the apparatus is embodied at the server 306. And, the server 306 makes the request of the trusted, third-party security server, also using signaling in analogous manner to the signaling 276-284.

In another implementation, an application is installable on to an SD card of the wireless device by way of a USB (Universal Serial Bus)-connected mass storage device. The SD card is represented by the block 312 in FIG. 4. In this implementation, an application is installed on the mass storage device to which the wireless devices connectable. The application runs when the mass storage device is connected to the wireless device. The application detects that a user has installed an application on the SD card 312. When this detection is made, a connection is made with the trusted, third-party, security provider by way of a wired connection, such as by way of the computer 302, connected to the network 118. And, responsive to a security decision returned by the security server, the security decision, and associated application permissions, cause further action, either to allow, disallow, or allow with caveats, the application installed at the SD card. If disallowed, the application is deleted from the SD card, and an appropriate message is made available for display at the wireless device to inform the user thereof of the disallowance. Alternately, rather than deleting the application, a permission is added to a file associated with the application. The file is subsequently accessed and read, obviating the need again to access the trusted, third-party security server. In one implementation, the file includes security measures, such as a signature on the file from the security provider.

In these implementations, reduced air interface signaling results, saving bandwidth, reducing wireless-device battery consumption, and time delays waiting for security decisions are reduced.

Figure 5:
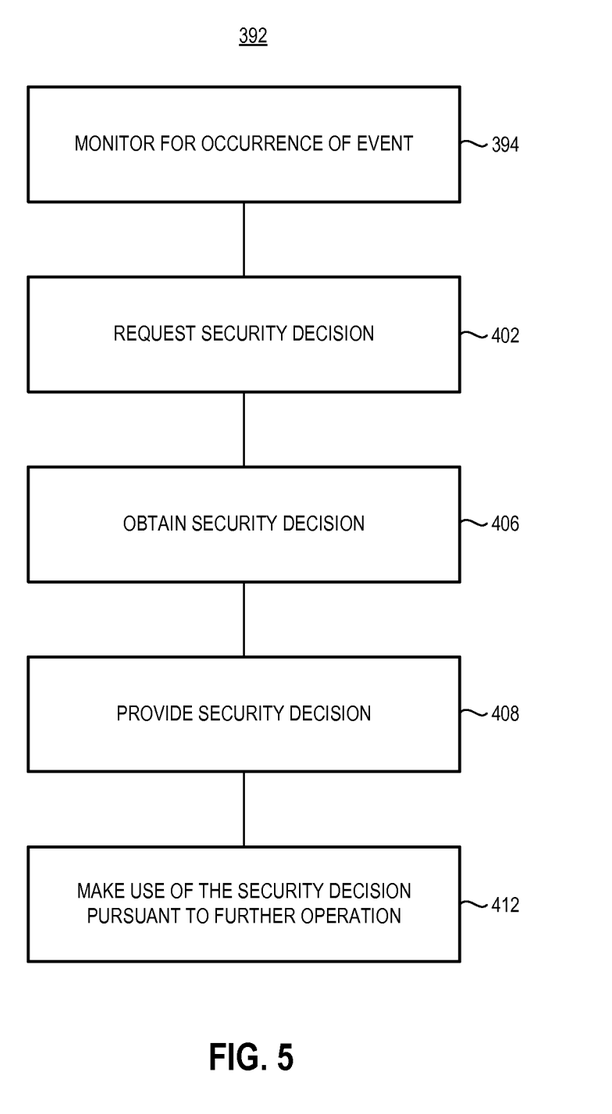
FIG. 5 illustrates a method flow diagram representative of the method of operation of an embodiment of the present disclosure.

FIG. 5 illustrates a method flow diagram 392, representative of the method of operation of an embodiment of the present disclosure. First, and as indicated by the block 394, monitoring is performed to monitor for the occurrence of an event necessitating a security decision. Upon occurrence of the event, a request, indicated at the block 402, is made for the security decision.

Then, the request is detected and, as indicated by the block 406, a security decision is obtained. Once obtained, and as indicated by the block 408, the obtained, security decision is then provided to the requestor. And, as indicated by the block 412, the security decision is used pursuant to the associated setting.

By outsourcing the security decision to a trusted, third-party, improved security is provided while also releasing a user or enterprise administrator of the burdens of making these security decisions.

Presently preferred embodiment of the disclosure and many of its improvements and advantages have been described with a degree of particularity. The description is of preferred examples for implementing the disclosure, and the description of preferred examples is not necessarily intended to limit the scope of the disclosure. The scope of the disclosure is defined by the following claims.

What is claimed is:

1. A wireless device, comprising:
a decision engine element including
a decision result detector;
a security-decision permission provider; and
a security decision event monitor, the decision result detector operable responsive to an indication from the security decision event monitor of an occurrence of an event associated with a security decision consumer application at the wireless device, the event necessitating an event security decision to permit selected wireless-device operation with the security decision consumer application, the decision-result detector configured to detect an outsourced-party-provided response security decision received from a remote trusted security server in response to a request for the event security decision from the wireless device, and the decision-result detector further configured to receive an unrequested additional security decision unrelated to the event, the unrequested additional security decision received from a remote trusted security server and associated with the security decision consumer application, the security-decision permission provider embodied at the wireless device and adapted to receive indication of the outsourced-party provided response security decision detected by the decision result detector and to receive indication of the unrequested additional security decision detected by the decision result detector, the security-decision permission provider configured to
provide to the security decision consumer application an indication of whether to permit the selected wireless-device operation based upon the outsourced-party-provided response security decision, and provide to the security decision consumer application a recommended security decision based upon the received indication of the unrequested additional security decision; and an outsourced-party-provided knowledge fetcher element configured to request and obtain the outsourced-party-provided response security decision from a remote trusted security server and to provide the outsourced-party-provided response security decision to the decision-result detector, and receive from a remote trusted security server and push the unrequested additional security decision to the decision-result detector.

2. The apparatus of claim 1 further comprising an event monitor configured to monitor the wireless device for the occurrence of the event necessitating the security decision.

3. The apparatus of claim 2 wherein the wireless device comprises at least one module whose operation is selectably invoked, and wherein the event monitor is configured to monitor for the occurrence of an event related to the module.

4. The apparatus of claim 1 further comprising a cache configured to store security-decision information.

5. The apparatus of claim 4 wherein the security-decision information comprises prior-detected, outsourced-party-provided security decisions.

6. The apparatus of claim 4 wherein the security-decision information stored at the cache is changeable.

7. The apparatus of claim 1 further comprising a security-decision consumer, the security-decision consumer adapted to receive the indication provided by the security-decision provider of whether to permit the selected wireless-device operation.

8. The apparatus of claim 7 wherein the security-decision consumer comprises a controller configured to control operation of the wireless device in conformity with the indication provided by the permission provider.

9. The apparatus of claim 8 wherein the wireless device comprises at least one module whose operation is selectably invoked and wherein the controller is configured to control operation of the module at the wireless device.

10. The apparatus of claim 1 wherein the decision-result detector is further configured to receive a plurality of outsourced-party-provided security decisions.

11. The apparatus of claim 10 further comprising a security-decision consumer and where the security-decision consumer receives the plurality of the outsourced-party-provided security decisions.

12. A method for facilitating security at a wireless device, the method comprising:

obtaining, by a knowledge fetcher element embodied at the wireless device, an outsourced-party-provided response security decision responsive to occurrence of an event necessitating an event response security decision received from a remote trusted security server in response to a request for the event security decision from the wireless device, to permit selected wireless-device operation with a security decision consumer application;

obtaining, by the knowledge fetcher embodied at the wireless device, an unrequested additional security decision unrelated to the event, the unrequested additional security decision received from a remote trusted security server and associated with the security decision consumer application;

detecting an outsourced-party-provided response security decision obtained during the obtaining responsive to the occurrence of the event necessitating the event response security decision to permit selected wireless-device operation;

providing an indication of whether to permit the selected wireless-device operation based upon the outsourced-party-provided response security decision; and provide to the security decision consumer application a recommended security decision based upon the received unrequested additional security decision.

13. The method of claim 12 further comprising:
monitoring the wireless device for occurrence of the event necessitating the event security decision.

14. The method of claim 13 further comprising controlling operation of the wireless device in conformity with the indication provided during the providing.

15. The method of claim 14 wherein the wireless device comprises at least one module whose operation is selectably invoked and wherein the controlling comprises controlling operation of the module at the wireless device.

16. The method of claim 12 wherein the detecting comprises detecting a plurality of outsourced-party-provided security decisions.

17. The method of claim 12 wherein the plurality of outsourced-party-provided security decisions are associated with a security-decision consumer.

18. A wireless device, comprising:

an outsourced-party-provided knowledge fetcher installed at the wireless device, the knowledge fetcher being associated with a remote trusted security server remote from the wireless device;

a security-decision-request detector configured to detect a wireless-device-generated security-decision request made at the wireless-device, responsive to occurrence of an event at the wireless device necessitating an event security decision to permit selected wireless-device operation;

a security decision provider configured to provide an outsourced-party-provided response security decision from an outsourced party remote from the wireless device and associated with the knowledge fetcher responsive to detection by the security-decision-request detector of the security-decision request for use by the wireless device; and wherein the knowledge fetcher is further configured to receive an unrequested additional security decision unrelated to the event, the unrequested additional security decision received from the remote trusted security server and associated with a security decision consumer application, and push the received unrequested additional security decision unrelated to the event to a security-decision permission provider at the wireless device and thereby provide a recommended security decision to the security decision consumer application based upon the received unrequested additional security decision.

19. A method at a wireless device for facilitating wireless device security, the method comprising:

installing an outsourced-party-provided knowledge fetcher at the wireless device, the knowledge fetcher being associated with a remote trusted security server remote from the wireless device;

detecting a wireless-device-generated security-decision request at the knowledge fetcher responsive to occurrence of an event at the wireless device necessitating an event security decision to permit selected wireless-device operation with a security decision consumer application at the wireless device;

acquiring at the knowledge fetcher, from the remote trusted security server, an outsourced-party-provided response security decision;

providing, with the knowledge fetcher, the outsourced-party-provided response security decision to the security decision consumer application;

obtaining, by the knowledge fetcher receiving from a remote trusted security server, an unrequested additional security decision unrelated to the event and associated with the security decision consumer application; and pushing, with the knowledge fetcher, to a security-decision permission provider at the wireless device the received unrequested additional security decision unrelated to the event and thereby providing a recommended security decision to the security decision consumer application based upon the received unrequested additional security decision.

20. The apparatus of claim 8 wherein the controller is configured to control, responsive to the indication provided by the permission provider, whether an application may be installed at the device.

* * * * *